United States Patent [19]

Bhatt et al.

[11] Patent Number: 4,595,255

[45] Date of Patent: Jun. 17, 1986

[54] OPTICAL FIBER WIRING CENTER

[75] Inventors: Vipul J. Bhatt Sevalia, Gujarat States, India; Alan B. Mann; Stanley S. Coe, both of Raleigh, N.C.

[73] Assignee: FiberLAN, Inc., Raleigh, N.C.

[21] Appl. No.: 526,082

[22] Filed: Aug. 24, 1983

[51] Int. Cl.⁴ ................................................ G02B 6/36
[52] U.S. Cl. ................................................ 350/96.20
[58] Field of Search ................ 350/96.15, 96.20, 96.21

[56] References Cited

U.S. PATENT DOCUMENTS 4,359,262 11/1982 Dolan ................................. 350/96.20
4,373,776 2/1983 Purdy ................................. 350/96.20
4,428,645 1/1984 Korbelak et al. .................. 350/96.20

FOREIGN PATENT DOCUMENTS 0045053 3/1980 Japan ................................. 350/96.21
0207213 12/1982 Japan ................................. 350/96.20

Primary Examiner—John Lee
Assistant Examiner—Lester Rushin, III
Attorney, Agent, or Firm—Roy B. Moffitt

[57] ABSTRACT

An optical fiber wiring center comprising a base, an optical fiber receiver means attached to and spaced apart from the base, the receiver means containing parallel first and second rows of individual open top cavities, the number of cavities in said first row being essentially equal to the number of cavities in said second row and any given cavity in the first row being essentially coplanar with one other cavity in the second row, and a splice holding means disposed between coplanar cavities.

13 Claims, 10 Drawing Figures

OPTICAL FIBER WIRING CENTER

BACKGROUND OF THE INVENTION

There are two basic problems that arise when optical fibers are used in Local Area Networks (LAN's): (a) what type of "wiring" scheme is to be used to connect the LAN's plurality of computers (stations) so that each station may communicate with another and (b) what type of interconnection techniques and facilities are to be employed so that stations may be added and removed as required of the LAN matures and changes from time to time. Applicants have found that one way to solve these problems is by means of the disclosed novel fiber optic wiring center that can accommodate and adapt to a bus, ring and point-to-point type fiber optic circuit as well as being able to interconnect with addtional and/or delete stations as the demand arises from time to time.

Local Area Network technology, as it presently exists, raises two concerns in the mind of a potential user: the first is the debate or uncertainty about the selection of the optimum LAN architecture/protocol, and the second is the anticipated obsolescence of existing networks. A potential user may be reluctant to install a fiber optic LAN network because the technology of fiber optics is moving so fast and corresponding obsolescense is ever present. For example, future technology may require a network with a different topology and protocol and may require rewiring a building or campus, resulting in high cost to the user. It is towards the solution of these two concerns of Local Area Networks—the reconfigurability from a Carrier Sensitive Multiple Access Collission Detection (CSMA/CD) bus network to a ring network on to a point-to-point network—that this invention is directed.

In case of LAN's problems of obsolescence and migration to different topologies are easier to solve if optical fibers are used as transmission medium. Local Area Networks are of these major types, multiple access bus such as CSMA/CD, ring types and point-to-point. Each of these types can take on the same star shaped topology when fiber optics are used as a transmission medium. Prior art multi-access bus type fiber optic networks use a star coupler to emulate a passive bus in which the central node consists of a star coupler connected to optical fibers drawn from nodes or stations located throughout a given building or campus.

For ring type networks, a star shaped topology is preferred for various reasons, including the convenience of implementation and maintainability. In this case, the central node consists of an array of interconnections allowing the fibers to be serially connected to form a ring. One type of a LAN is referred to as an Ethernet type system. It has a bus type configuration only. Another type of LAN, a token ring, usually has a ring type topology. Still another is a point-to-point system. All may be defind as a plurality of computers or stations connected together so that one computer or station may communicate with another. The problem then reduces itself down to the requirement or need of a fiber optic interconnection scheme and apparatus that will permit efficient transition back and forth from one type of network (ring) to another (bus).

Local Area Network interconnection system has a different set of priorities and problems than the priorities and problems of long haul trunk telecommunication networks. LAN's typically have a geographic coverage of only a few kilometers, but they require a large number of interconnections to provide access to the LAN by the various stations. Consequently, splicing speed and accessibility is quite important and ultra low splice loss is not all that critical as it is in long haul trunk type telecommunication networks. Furthermore, an installed LAN can be expected, if not guaranteed, to undergo reconfiguration during its life time; consequently, a re-enterable splice is therefore an option that is not only desirable but almost a requirement.

A BRIEF DESCRIPTION OF THE INVENTION

The disclosed optical fiber wiring center is adapted to solve the reconfigurability problem and comprises a base; an optical fiber receiving means attached to and spaced apart from the base, the receiving means containing first and second rows of individual open top cavities used to store excess footage of optical fibers, the number of cavities in the first row being essentially equal to the number of cavities in the second row and any given cavity in the first row is essentially coplanar with one other cavity in the second row; and, a splice holding means disposed between coplanar cavities.

The underside surface of the receiving means is curvilinear in shape. Also included in the wiring center is a curvilinear shaped radius plate (to prevent sharp bends of optical fibers) disposed between the receiving means and the base, spaced apart from the base and attached to the receiving means and base. In addition, there is a curvilinear shaped entry plate (designed to prevent sharp bends in the optical fibers of the incoming cable) the longitudinal axis of which is essentially perpendicular to the longitudinal axis of the first and second parallel rows. The elements of the wiring center described above are housed in a box to which there is affixed a door. The base is hingably attached to one sidewall of the box so that a closed door first position of storage inside of the box can be achieved. When the door is opened, the base, on its hinge may be moved outwardly into an exposed or second position. Disposed between the radius plate and base is an optical coupler, in the event that a bus type or star coupler type circuit is required. Obviously, the star coupler is not used in the ring configurated type system. The radius plate has on its two terminal edges means whereby optical fibers can be removably affixed.

DETAILED DESCRIPTION OF THE INVENTION

Figure 1:
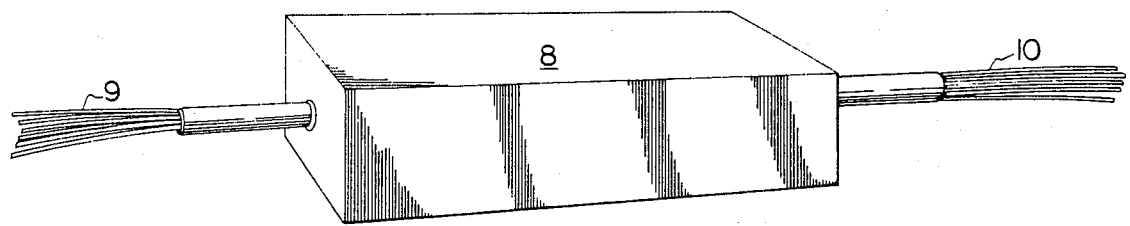
FIG. 1 is an isometric view of a star type optical coupler.
Figure 2:
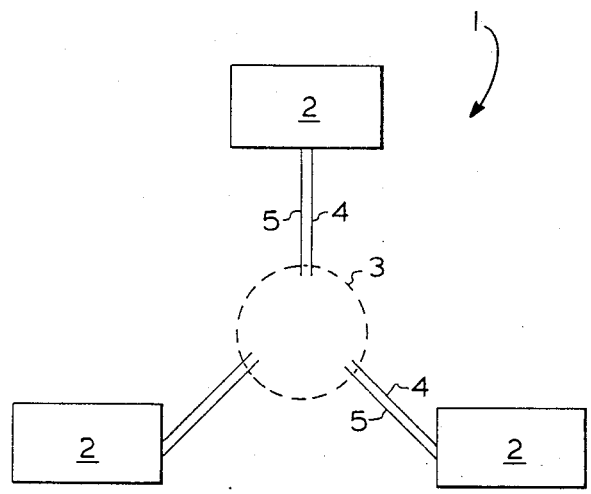
FIG. 2 is a schematic representation of a Local Area Network (LAN).
Figure 3:
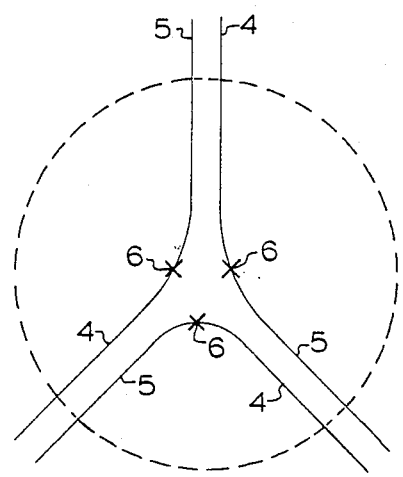
FIG. 3 is a schematic representation of the ring type embodiment of the wiring of the LAN of FIG. 2.
Figure 4:
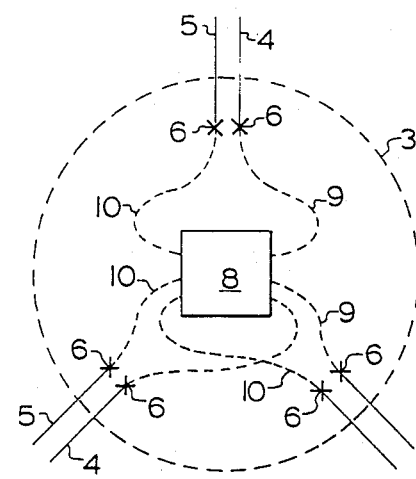
FIG. 4 is a schematic diagram of the bus mode (star coupler) type embodiment of the wiring of the LAN of FIG. 2.

Shown in FIG. 2 by element 1 is a simplified Local Area Network, made up stations or computers 2 connected to a common bus 3 by optical fibers 4 and 5, which can be arbitrarily designated as transmitting and receiving fibers respectively. Common bus 3 can take the alternative configurations of either FIG. 3 or FIG. 4. FIG. 3 shows an embodiment of element 3 that is referred to as a ring system. It will be noted that transmitting fiber 4 is spliced by means of splice 6 to receive fiber 5, this sequence being repeated throughout to form a communication "ring." The embodiment shown in FIG. 4 employs a star coupler (see also FIG. 1) type shown diagramatically by element 8. Star coupler 8 has incoming and outgoing fibers 9 and 10 respectively. Incoming fibers 9 are connected to transmit fiber 4 by splice 6 and outgoing fiber 10 is connected by a like splice 6 to receive fiber 5 throughout this embodiment. Fibers 9 and 10 are commonly referred to in practice as "pigtails."

Figure 6:
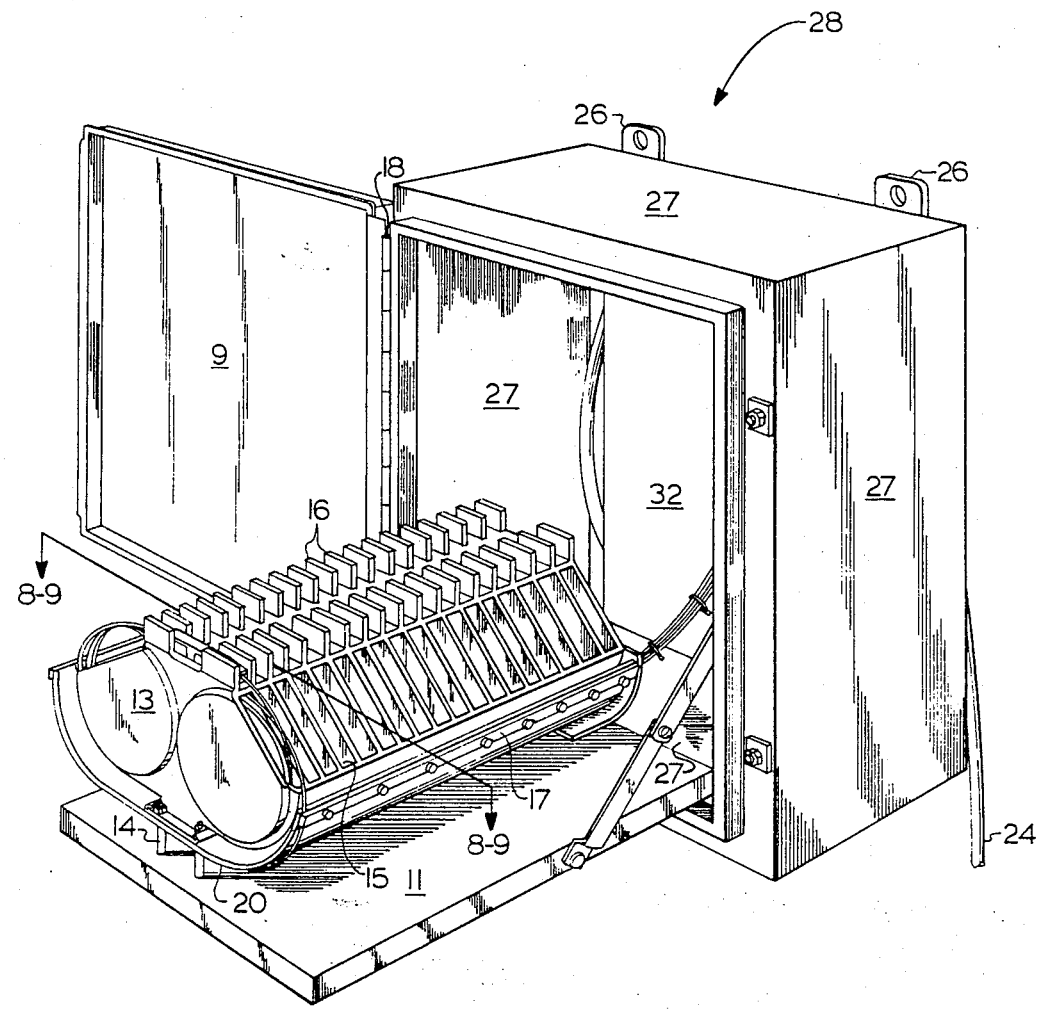
FIG. 6 is an isometric representation of the wiring center of the present invention in its open accessible position.
Figure 10:
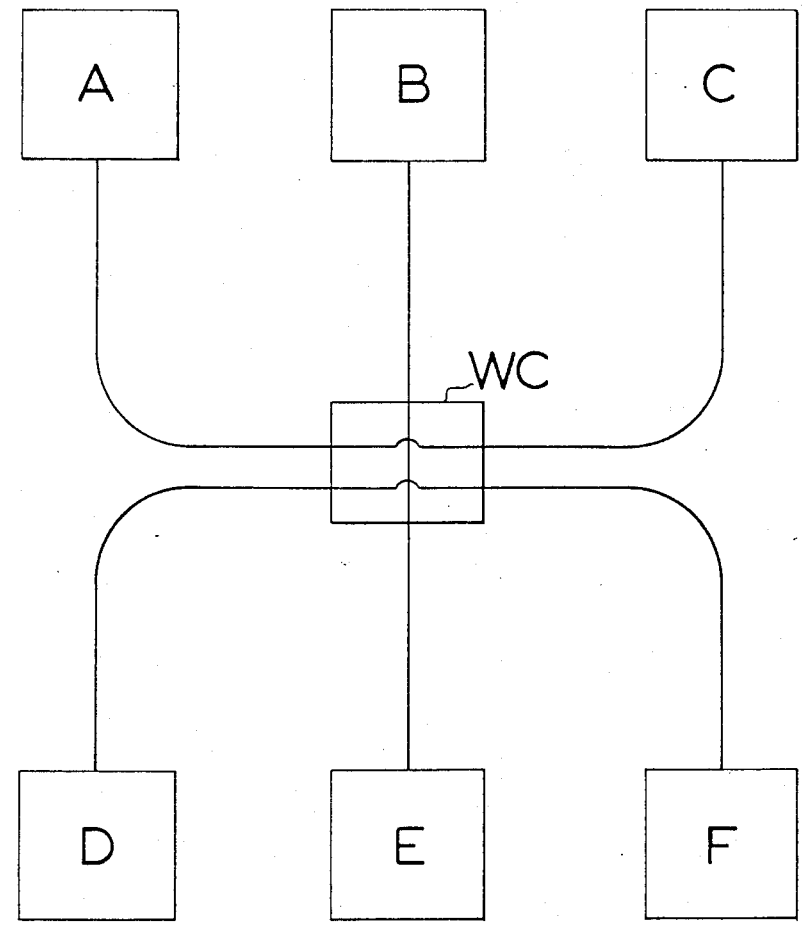
FIG. 10 is a schematic representation of a point-to-point wiring scheme.

A point-to-point wiring system is shown in FIG. 10, where computers A, B, C, D, E and F are wired one to another through wiring center WC (element 28 of FIG. 6). In this exmple, computer A is wired to computer C, computer B to computer E and computer D to computer F, all through the wiring center WC. A can only communicate with C, B with E and D with F.

One of the objects of the present invention to be able to switch from the ring to a star coupler configuration to point to point and back again with ease. To accomplish this the wiring center means 28 of FIG. 6 is used. Splicing means 6, sometimes referred to as an elastomeric splice may be used in combination with wiring center 28 and is composed of basically two elements, a top 7 having downwardly protruding engaging means 31 and base 9, which has therein cavities 33 in which engaging means 31 can be engageably inserted. Base 9 contains upstanding guide means 10, fiber hold-down means 11 and an elastomeric splice 12, which is basically a cylinder of plastic material containing a tapered center hole into which optical fibers 4, 5, 9 or 10 are inserted and are held in abutting optical and mechanical relationship one to another. Splice means 6, after having been used to splice a two given fibers one to another in optical connection, is inserted into splice holding means or cavity formed by upstanding members 16 of receiving means 13. Optical fiber wiring center 28, as shown in FIG. 6 is composed of a cabinet or box having sidewalls 27, back 32 and door 9 hingably attached by hinge 18 to box 27. It also includes bracket means 26 for affixing the wiring center to a wall or post. Included in the wiring center 7 is a base 11, hingably attached to sidewall 27 by folding means 12 and hinge 30. Base 11 is like a fold-out shelf, which when door 9 is open can be moved from an upstanding position (not shown) to a horizontal position as shown in FIG. 6, and has affixed thereto and spaced therefrom receiving means 13, which contains two parallel rows of open top cavities 15. Each open top cavity for any given row is in coplanar relationship with an open top cavity of the other row. Receiving means 13 has a bottom portion that is curvilinear in shape and spaced apart from receiving means 13 bottom and base 11 and attached to both by means of bolt 14 is radius plate 20 also curvilinear in shape. Radius plate 20 has on its terminal edges bar 17 which is removably affixed to radius plate 20 and is used to removably affix optical fibers 4, 5, or 9 and 10 to the radius plate as desired. Cable 24 containing both transmitting and receiving fibers 4 and 5 enters the box from the rear portion thereof and once the jacket of the cable is stripped away to expose the fibers, such are brought underneath receiving means 13 in the manner shown in FIGS. 6 and 7. Fibers 4 and 5 are disposed underneath entry plate 18, which is also curvilinear in shape. The curvilinear shape of entry plate 18 and radius plate 20 have a definite function, i.e., to prohibit sharp bends of the optical fibers so as to preserve their transmission integrity.

Figure 7:
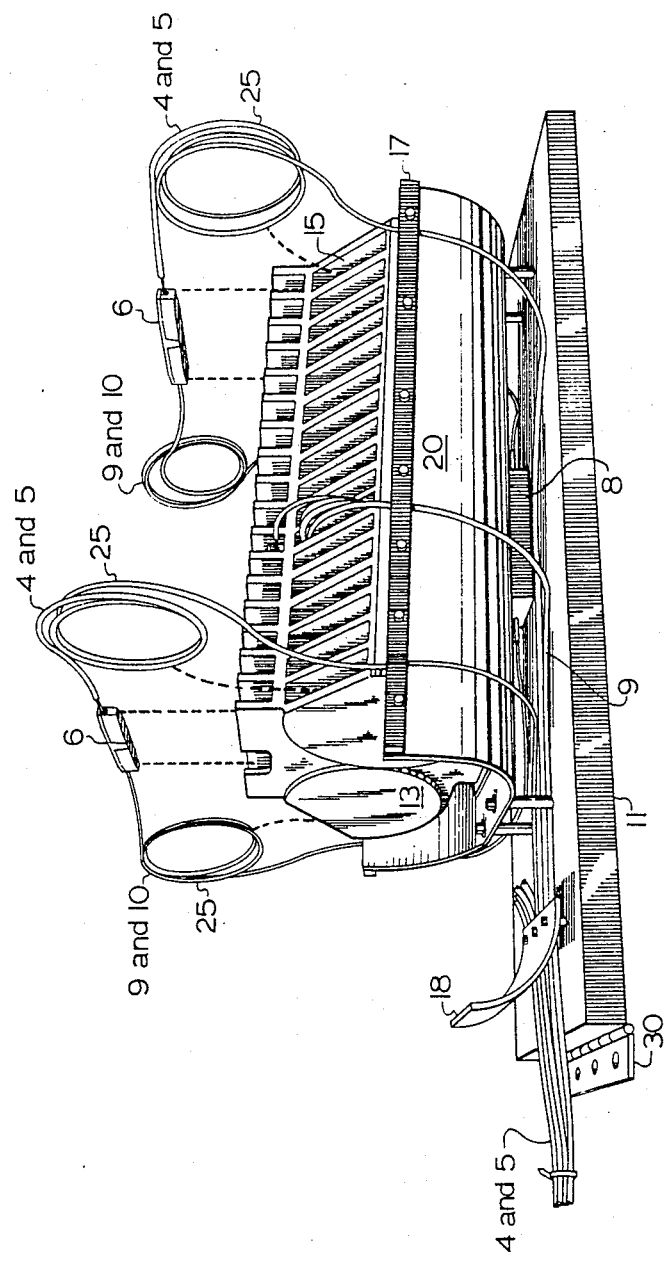
FIG. 7 is an isometric view of the receiving means, base, entry and radius plate, star coupler and spliced optical fibers of the invention shown by FIG. 6.

Turning now to FIG. 7 here is shown base 11 and receiving means 13 of the optical fiber wiring center 28 in a more detailed manner. Base 11 is attached to sidewall (bottom) 27 by hinge 30. Transmitting and receiving fibers 4 and 5 are brought in and disposed underneath entry plate 18, which is spaced apart from the upper surface of base 11 by bolt means (not shown). Radius plate 20 is spaced apart from base plate 11 by bolts 14 and disposed between the under surface of radius plate 20 and base 11 is star coupler 8. An example of a commercially available star coupler is one sold by Canstar Communications, Ontario, Canada under the model number of TCS 8X8-100. Incoming and outgoing fibers 9 and 10 of star coupler 8 can be disposed on either lateral side of radius plate 20, they being disposed on the unseen side of radius plate 20 of FIG. 6. Transmitting and receiving fibers 4 and 5 from cable 24 are shown in FIG. 7 as being on the observable side of radius plate 20 and are brought in under the radius plate along its longitudinal axis and then brought transversed thereto upon along the side of the radius plate, held down by bar 17, then rolled up into a coil 25, such coil being adapted to fit inside of cavity 15 in a neat manner. Fiber 4 or 5 of coil 25 is spliced to fiber 9 or 10, as the case may be depending on whether a ring or a star coupler type system is desired, using splice 6. Coils 25 disposed in cavity means 15 permit the making of many splices and changes over the life of the system. Splice 6 is inserted into the splice holding cavity formed by upstanding splice receiving means 16 and thereby secured. If something needs to be changed, splice 6 need only to be removed from the splice removing means 16, the connection rendered by the splice broken, and a new splice made depending on the circuit desired.

Figure 5:
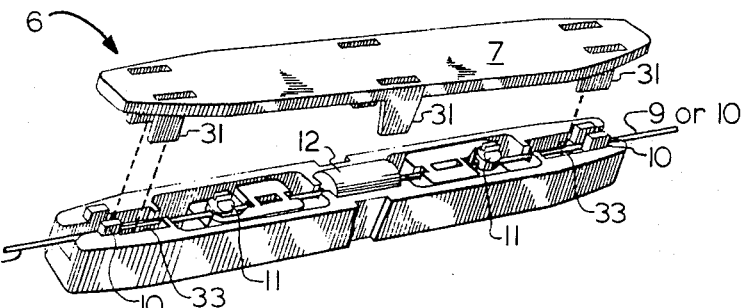
FIG. 5 is an isometric representation of a prior art elastomeric type re-enterable optical fiber splice.
Figure 8:
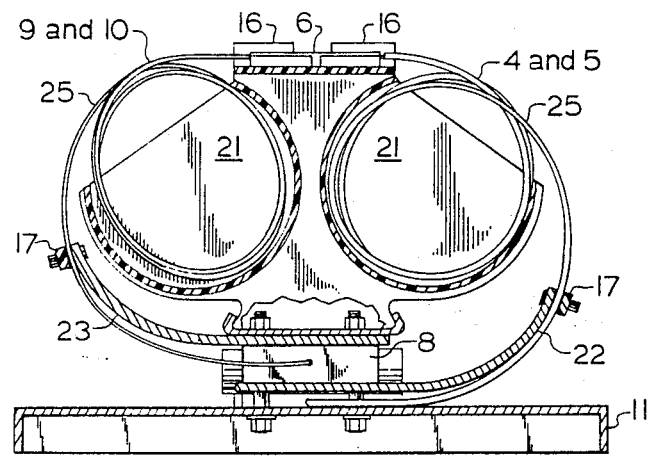
FIG. 8 is a cross section along line 8—8 of FIG. 6.
Figure 9:
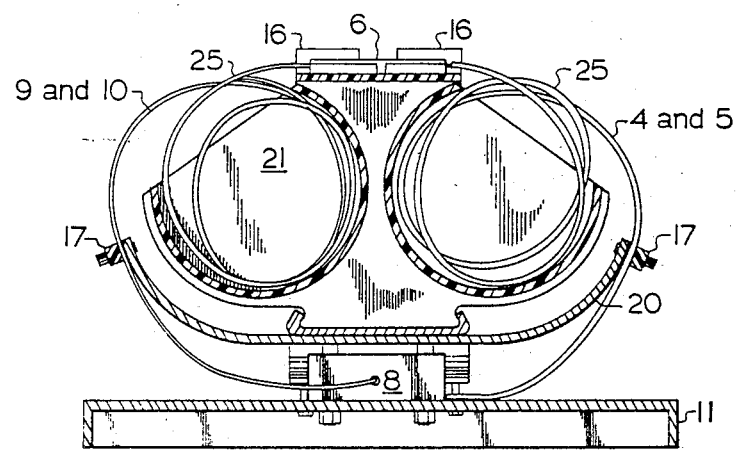
FIG. 9 is a cross section along line 9—9 of FIG. 6.

FIGS. 8 and 9 are cross sections along line 8—8 and 9—9 respectively of FIG. 5 and showing two different embodiments of the radius plate. The preferred embodiment is shown by FIG. 9 and is that embodiment also shown in FIGS. 6 and 7, i.e., the radius plate 20 being an integral one. As an alternative, radius plate 22 and 23 of FIG. 8 is still a curvilinear plate like that of element 20 of FIG. 8, but it consists of two radius plates, namely 22 and 23, the terminal portions of which overlap. Where the terminal portions overlap optical coupler 8 is affixed thereto. Also shown in FIGS. 8 and 9 is how coils 25 fit into cavities 15 formed by sidewalls 21 of the receiving means 13.

Fiber optic wiring center 7 as described above provides a connection and reconfiguration mechanism in combination with the re-enterable and remountable elastomeric splice 6. However other type splices can be used, e.g., fusion type splices. Using this optical wiring center, one can (a) connect indoors/outdoor backbone cable to interior distribution cable for each building or each floor in the building; (b) connect terminals in a bus structure using the transmissive star coupler; (c) connect terminals in a ring structure using the elastomeric splices in a star shaped ring topology; (d) connect terminals in a point-to-point configuration; (e) perform original installation using only simple hand tools and normal skill level craftsmen (assuming use of elastomeric type splice) - the only unusual tool required is a fiber clever to break clean flat ends on the fiber terminal portions inserted into fiber holding means 12, and (f) with the use of removable splice means 6, one can reconnect, reassign cables as desired, even change network topology from bus to ring to point-to-point at will. In addition, the fiber optic wiring center 28 provides a convenient "map" of the structure of the installed wiring. It allows multiple networks to be overlayed using the same transmission cable, i.e., bus, ring and point-to-point networks can all co-exist with the same cable.

The disclosed fiber optic wiring center 28 introduces the characteristic of network reconfigurability. During any such activity, the splices are easily accessible and sequentially stored. For CSMA/CD type networks, cable 24 is spliced into a star coupler 8. Both the cable leads and star coupler pigtails are gently guided by entry plate 18 and radius plate 20 into their respective splice locations. For ring and point-to-point networks, the star coupler is removed, and the cable leads are rearranged as necessary to make splices for completion of a ring topology, see FIG. 2 or a point-to-point connection (FIG. 10). Transition from a CSMA/CD type star coupler network (FIG. 4) to a ring network (FIG. 3) to a point-to-point is easily and efficiently achieved.

Splice means 6 easily snaps in their respective cavities formed by upstanding splice holding means 16 mounted on the uppermost portion of receiving means 13 providing a horizonal working surface. Such a splice is one that is sold by General Telephone Electronics and introduces to the system only a loss less than 0.5 or db in field conditions.

Considering the large number of interconnections likely for a Local Area Network and an anticipated need to reconfigure, it is important to structure an interconnection system so that splicing a particular fiber path is done with a minimum waste of time and effort. The present invention accomplishes this objective by exclusively assigning coil 25 to each splice either fusion splice or one accomplished by elastomeric splice 6. The excess fiber 25 for each splice is coiled and stored within the particular pocket 15 so that any spice can be re-entered without disturbing other splices or their excess fiber coils 25. Such is especially helpful when fusion splicing is used. Pockets for open top cavities 15 are arrayed in two parallel rows, clearly visible and sequentially pre-labeled.

Uncertainties in the selection of an optical Local Area Network architecture a user concerned about obsolescence has been satisfied by the disclosed fiber optic wiring center, which offers quick interconnection and ease of reconfiguration from multi-access type networks to ring to point-to-point networks and vice versa.

What is claimed is:
1. An optical fiber wiring center comprising:
   (a) a base member;
   (b) an optical fiber receiving means having top and bottom portions, said bottom portion attached, essentially parallel to, and spaced apart from said base member, said receiving means containing first and second parallel rows of individual open top cavities thereon, any given cavity in the first row being essentially co-planar with one of the cavities in the second row and in communication with a part of the top portion; and,
   (c) a splice holding means disposed on the top portion of the optical fiber receiving means between co-planar cavities.
2. The optical fiber wiring center of claim 1 wherein the base member is a single base member.
3. An optical fiber wiring center comprising:
   (a) a base member;
   (b) an optical fiber receiving means having top and bottom portions, said bottom portion attached essentially parallel to and spaced apart from said base member, said receiving means containing first and second parallel rows of individual open top cavities thereon, any given cavity in the first row being essentially co-planar with one of the cavities in the second row and in communication with a part of the top portion;
   (c) a splice holding means disposed on the top portion of the optical fiber receiving means between co-planar cavities; and
   (d) an open top container movably attached to the base member.
4. The optical fiber wiring center of claim 3 wherein the base member is hingeably affixed to the open top container so that the base member is movable from a first to a second position, said first position disposing the optical fiber receiving and splice holding means inside of the open top container and in the second position disposing at least a portion of the optical fiber and splice holding means outside of the open top container.
5. The optical fiber wiring center of claim 4 wherein a portion of the receiving means is curvilinear.
6. The optical fiber wiring center of claim 4 including a curvilinear shaped entry plate having a longitudinal axis, said axis being essentially perpendiuclar to the longitudinal axis of the first and second parallel rows.
7. The optical fiber wiring center of claim 4 wherein the splice holding means comprises upstanding spaced apart flexible posts, each pair of adjacent posts in which two optical fibers may be held in abutting optical communication with one another.
8. The optical fiber wiring center of claim 4 wherein the number of cavities in said first row is essentially equal to the number of cavities in said second row.
9. The optical fiber wiring center of claim 4 including a door means wherein said door means is hingeably affixed to the open top container and is of a size and so hingeably affixed to said open top container so that when the base member is in the first position, the door means may be moved to a position whereby it covers the open top of the open top container.
10. The optical fiber wiring center of claim 4 containing a curvilinear shaped radius plate disposed between the receiving means and said base member, spacec apart from said base member and attached to the receiving means and base member.
11. The optical fiber wiring center of claim 10 including an optical fiber coupler means attached to the base member and said radius plate.
12. The optical fiber wiring center of claim 10 wherein said radius plate contains means to secure optical fibers thereto.
13. The optical fiber wiring center of claim 12 wherein the means to secure optical fibers is a bar adapted to be removably affixed to the radius plate.

* * * * *